US012587583B2

(12) United States Patent
Misztur et al.

(10) Patent No.: US 12,587,583 B2
(45) Date of Patent: Mar. 24, 2026

(54) EMBEDDED SYSTEMS, AND METHODS, HAVING SENSOR SIGNAL INTERFACES FOR IMPROVING MAINTENANCE AND DATA ACQUISITION IN MANUFACTURING OPERATIONS

(71) Applicant: MRIIOT LLC, Crystal Lake, IL (US)

(72) Inventors: Krzysztof Maciej Misztur, Crystal Lake, IL (US); Steffen Eudy, Warrenton, MO (US); Nicholas John Amenda, Beloit, WI (US)

(73) Assignee: MRIIOT LLC, Crystal Lake, IL (US)

( * ) Notice: Subject to any disclaimer, the term of this patent is extended or adjusted under 35 U.S.C. 154(b) by 0 days.

(21) Appl. No.: 18/747,269

(22) Filed: Jun. 18, 2024

(65) Prior Publication Data

US 2025/0016224 A1    Jan. 9, 2025

Related U.S. Application Data

(60) Provisional application No. 63/512,081, filed on Jul. 6, 2023.

(51) Int. Cl.
H04L 67/1042 (2022.01)
H04L 12/10 (2006.01)

(52) U.S. Cl.
CPC .......... H04L 67/1042 (2013.01); H04L 12/10 (2013.01)

(58) Field of Classification Search
CPC ............................ H04L 67/1042; H04L 12/10
See application file for complete search history.

(56) References Cited

U.S. PATENT DOCUMENTS 8,266,327 B2 * 9/2012 Kumar .................... H04L 63/08
                                                    709/227
8,578,076 B2 * 11/2013 van der Linden ...... H04L 47/70
                                                    709/227
(Continued)

OTHER PUBLICATIONS

Makhijani et al., "TinTin: Tiny In-Network Transport for High Precision INdustrial Communication", 2022 IEEE 30th International Conference on Network Protocols, Oct. 30, 2022.*

(Continued)

*Primary Examiner* — Todd L Barker
(74) *Attorney, Agent, or Firm* — Thomas Hayes

(57) ABSTRACT

A device electrically coupled with manufacturing equipment and in digital communications with an equipment logic controller, data acquisition system, or both. The device comprises a processor that executes an instruction set. Execution of the instruction set causes the processor to condition signals captured by a sensor, generate a message that comprises a discrete signals and signal identifier, determine an address and service port a process control broker, and send the message to the process control broker. The service port is configured for use as a peer-to-peer connection. The device comprises a PoE device electrically coupled with an ethernet port, the processor, and a PNP-NPN switch. The device is electrically coupled with the PNP-NPN switch. The processor is communicably coupled with the ethernet port. The process control broker processes the message and performs one or more commands, including providing the discrete signal and signal identifier to an equipment process controller.

20 Claims, 5 Drawing Sheets

(56)　　　　　　References Cited

U.S. PATENT DOCUMENTS

| | | | |
|---|---|---|---|
| 2014/0289333 A1* | 9/2014 | Chan | H04L 63/08 |
| | | | 709/204 |
| 2018/0255131 A1* | 9/2018 | Stöcker | G06Q 50/40 |
| 2024/0305685 A1* | 9/2024 | Chalakov | H04L 67/104 |

OTHER PUBLICATIONS

Aboodi et al, "Survey on the Incorporation of NDN/CCN in IoT", IEEE Access, May 1, 2019.*

Lacamera et al, "Embedded Systems Architecutre: Desing and write software for embedded devices to build safe and connected systems", Jan. 2023.*

Yan et al, "A Publish/Subscribe Architecture for Sensor Networks and Applications", 2006 International Conference on Mechatronics and Automation, Jun. 25, 2006.*

Makhijani et al, "TinZTinL Tiny In-Network Transport for High Precision Industrial Communication" IEEE 30th International Conference on Network Protocols, Oct. 2022.*

\* cited by examiner

FIG. 2

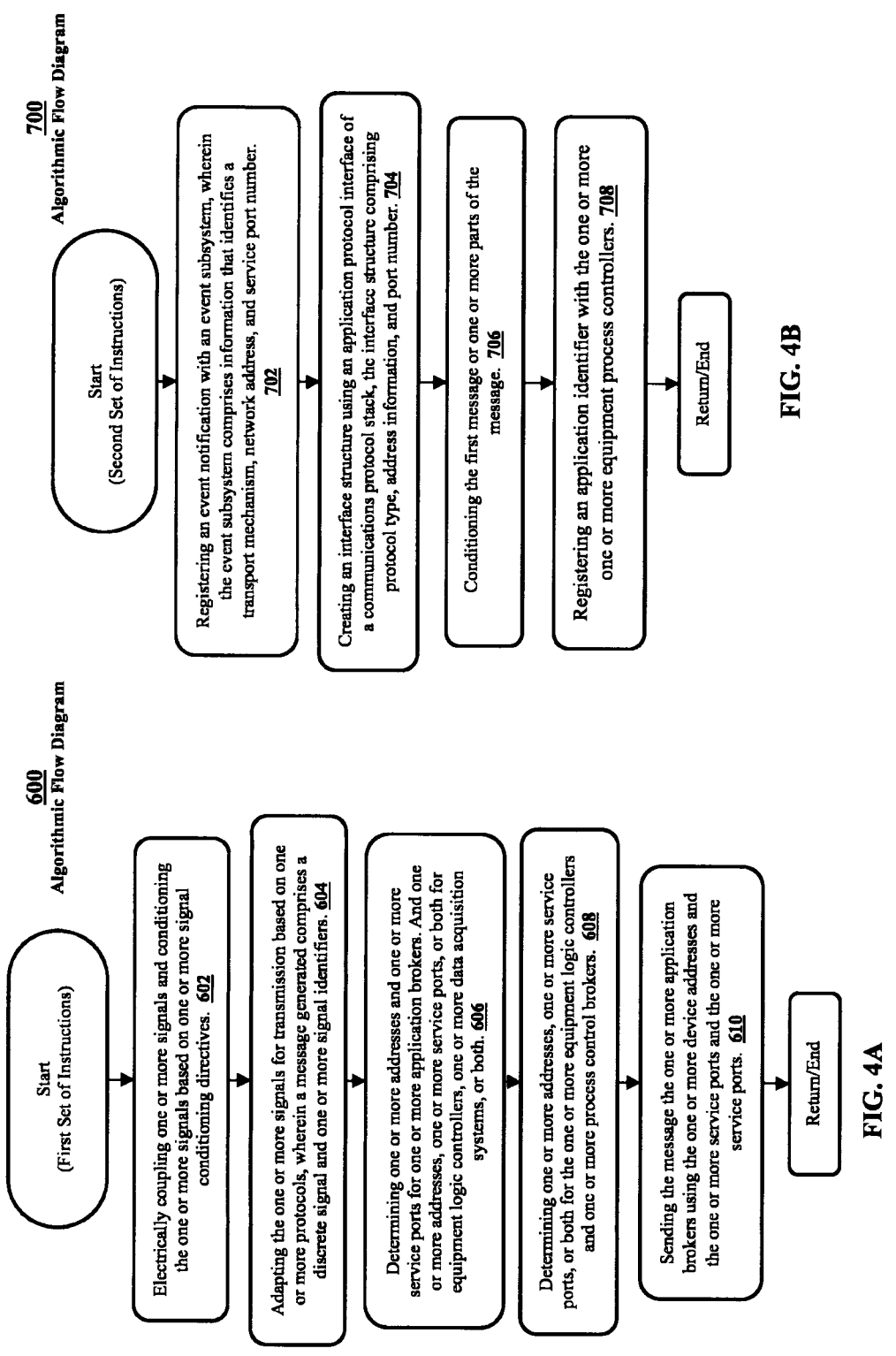

700
Algorithmic Flow Diagram

Start
(Second Set of Instructions)

Registering an event notification with an event subsystem, wherein the event subsystem comprises information that identifies a transport mechanism, network address, and service port number. 702

Creating an interface structure using an application protocol interface of a communications protocol stack, the interface structure comprising protocol type, address information, and port number. 704

Conditioning the first message or one or more parts of the message. 706

Registering an application identifier with the one or more one or more equipment process controllers. 708

Return/End

FIG. 4B

600
Algorithmic Flow Diagram

Start
(First Set of Instructions)

Electrically coupling one or more signals and conditioning the one or more signals based on one or more signal conditioning directives. 602

Adapting the one or more signals for transmission based on one or more protocols, wherein a message generated comprises a discrete signal and one or more signal identifiers. 604

Determining one or more addresses and one or more service ports for one or more application brokers. And one or more addresses, one or more service ports, or both for equipment logic controllers, one or more data acquisition systems, or both. 606

Determining one or more addresses, one or more service ports, or both for the one or more equipment logic controllers and one or more process control brokers. 608

Sending the message the one or more application brokers using the one or more device addresses and the one or more service ports and the one or more service ports. 610

Return/End

FIG. 4A

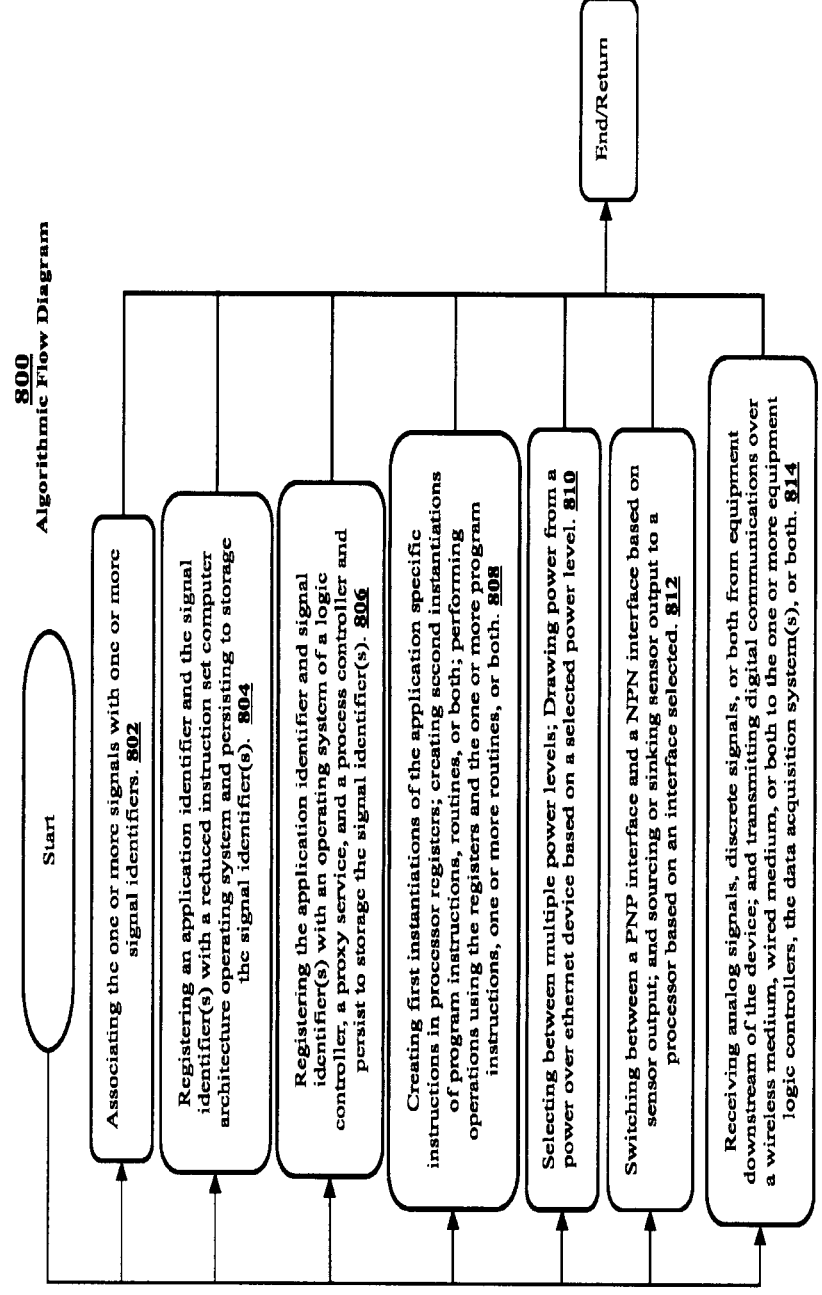

800
Algorithmic Flow Diagram

Start

Associating the one or more signals with one or more signal identifiers. 802

Registering an application identifier and the signal identifier(s) with a reduced instruction set computer architecture operating system and persisting to storage the signal identifier(s). 804

Registering the application identifier and signal identifier(s) with an operating system of a logic controller, a proxy service, and a process controller and persist to storage the signal identifier(s). 806

Creating first instantiations of the application specific instructions in processor registers; creating second instantiations of program instructions, routines, or both; performing operations using the registers and the one or more program instructions, one or more routines, or both. 808

Selecting between multiple power levels; Drawing power from a power over ethernet device based on a selected power level. 810

Switching between a PNP interface and a NPN interface based on sensor output; and sourcing or sinking sensor output to a processor based on an interface selected. 812

Receiving analog signals, discrete signals, or both from equipment downstream of the device; and transmitting digital communications over a wireless medium, wired medium, or both to the one or more equipment logic controllers, the data acquisition system(s), or both. 814

End/Return

FIG. 4C

EMBEDDED SYSTEMS, AND METHODS, HAVING SENSOR SIGNAL INTERFACES FOR IMPROVING MAINTENANCE AND DATA ACQUISITION IN MANUFACTURING OPERATIONS

CROSS-REFERENCE TO RELATED APPLICATION

This application claims priority to U.S. Provisional Application No. 62/393,148, filed Jul. 6, 2023, the contents of which are incorporated herein by reference.

FIELD OF THE DISCLOSURE

The disclosure relates to computer systems based on specific computational models and control or regulating systems and, more specifically, Industrial Internet of Things (IIoT), distributed computing systems, monitoring systems, sensors, peer-to-peer connectivity, manufacturing process controls, virtual manufacturing process controls.

BACKGROUND

A sensor is an instrument designed to sense or detect a phenomenon and generate signals in response. An embedded system is a computer system that performs a specific task using a reduced set of system resources. Embedded systems are designed for use in applications where a small device profile is a necessity. IoT are "Things" connected to the Internet, e.g., using an embedded system designed and configured to collect data from the "Things" and near the "Things," process the data, and relay the data to a remote system for further processing.

IoT has found utility in commercial and industrial settings. The things of an ecosystem that need to be monitored, controlled, or both for the purpose of creating new businesses or improving existing businesses are usually in a distributed environment remote from an ecosystem command and control center. As such, the things require network connectivity, minimal computing resources, and small device profiles. However, each new application of IoT that requires more than basic connectivity creates unique technical challenges.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A shows an example of a computing environment, in accordance with one or more aspects of the present disclosure.

FIG. 2B is an example of computing environment threads, in accordance with one or more aspects of the present disclosure.

FIG. 4A shows an illustration of a computer algorithm comprising various instructions for performing one or more of the processes disclosed herein, in accordance with one or more aspects of the present disclosure.

FIG. 4B shows an illustration of a computer algorithm comprising various instructions for performing one or more of the processes disclosed herein, according to one or more aspects of the present disclosure.

FIG. 4C shows an illustration of a computer algorithm comprising various instructions for performing one or more tasks of the processes described in the algorithms of FIGS. 4A and 4B, in accordance with one or more aspects of the present disclosure.

DETAILED DESCRIPTION

Figure 1:
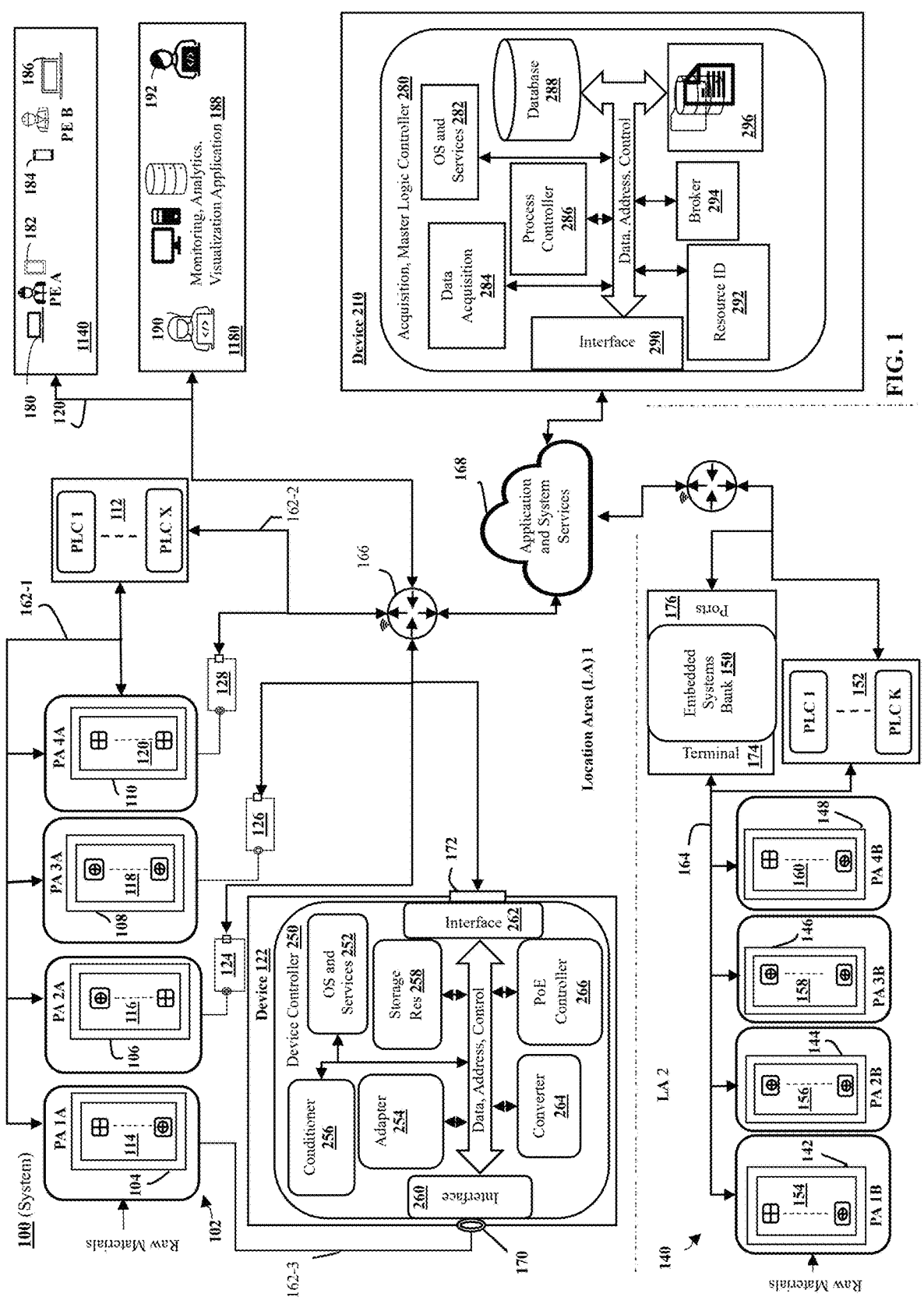
FIG. 1 shows a diagram of a system used to manufacture products based on product and system requirements, in accordance with one or more aspects of the present disclosure.

Automation of industries is necessary for many reasons, such as process improvements, product quality, safety, price control, and to maintain competitiveness. Research and development of Artificial Intelligence (AI) have recently advanced technology from its use in a few niche markets to more mainstream markets. Some industries, such as the automotive industry, have been automated for some time, while many others, e.g., the textile fabrication industry, have a way to go. Regardless, the introduction of more robust AI technologies will ensure the collection of data will become even more important for analytics use reasons. Additionally, AI technologies require quality datasets for training algorithms, predictive analysis, and visualization.

In traditional manufacturing settings, plant equipment may be spread out and at a considerable distance from where an industrial computer system, e.g. Programmable Logic Controllers (PLC), may be stored, which is often in a cabinet that acts as a hub for the plant equipment. Sensors mounted to plant equipment monitor process conditions and generate analog or discrete signals. Actuators coupled to plant equipment create an action in response to receiving a signal. The sensors and actuators are coupled to various devices or components of the plant equipment. The sensors and actuators are coupled to the industrial computer system through conductive wiring.

Additionally, plant equipment and the manufacturing facility may include many sensors and many sensors of different types. In some facilities, the number of sensors can be in the thousands. The sensors can be used for the purpose of monitoring process control variables, monitoring air quality, tracking assets, and managing inventory, to name just a few. The sensors can be simple instruments that sense, e.g., a change in resistance across a circuit to more sophisticated sensors that can sense a change in pressure, generate a discrete signal, and interface the discrete signal over a network connection.

Furthermore, sensors of the same type may be manufactured by different manufacturers and according to different specifications. As a result, each sensor of the same type may not produce the same results. The cost of each sensor can also vary based on manufacturer, type, and quality.

Technical Problem

In a manufacturing facility, sensors comprise a combination of analog sensors and digital sensors with various levels of digital intelligence. In a manufacturing setting, such as production, development, and testing, these sensors can get damaged, go missing (removed without being replaced), fail for various reasons, etc. Replacing a sensor may require several different tools, extensive disassembly and reassembly, and an inventory of replacement sensors and equipment and/or device parts.

Further, while a sensor is being replaced, equipment may need to be taken offline or its operations affected in some manner. Furthermore, a manufacturer may have limited maintenance resources, inexperienced personnel, or personnel with limited technical knowledge. These are all factors that can negatively impact cost and quality of manufacturing.

As a result, it is not uncommon for equipment in a manufacturing facility to not include a fully functioning array of sensors necessary to maintain proper control and function of the equipment. This not only can lower product quality but create hazardous conditions, putting the safety of personnel in jeopardy. Additionally, in facilities that rely on data acquisition for analytics, it can negatively impact data quality and integrity.

Also, the various devices or components and their couplings with the sensors and actuators, the electrical wiring, the length of the wiring, the coupling with the industrial computer system, the ambient environment of the manufacturing facility are all factors that contribute to the overall noise floor level. Due to the low power levels used in these types of systems and the noise floor level, data acquisition of the signals can result in corrupt discrete signals. Corrupted discrete signals can have undesirable effects on process control, product quality, product yield, data collection practices, and analytics.

The problem is compounded by sensors that are replaced during operations. The replacement sensor may not be compatible with process specifications and may not have signal processing capabilities.

Solution Overview

Presented herein is a device and system comprising embedded systems electrically coupled with manufacturing equipment and in digital communication with one or more brokers. Each broker is in digital communication with one or more process controllers, data acquisition systems, data management systems, analytics system, or any combination thereof.

The device comprises a storage resource that stores multiple instruction sets, and a first processor that executes a first instruction set. Execution of the first instruction set causes the first processor to: condition one or more captured signals based on one or more signal conditioning instructions; adapt the one or more signals for transmission based on one or more protocols, wherein a message generated comprises one or more discrete signals and one or more signal identifiers, determine one or more addresses and one or more service ports for one or more application brokers and the one or more equipment logic controllers, the one or more data acquisition systems, or both, and send the first message to the one or more application brokers using the one or more device addresses and the one or more service ports. In some embodiments, the one or more service ports are configured for use as a peer-to-peer connection.

The system includes a storage resource that stores multiple instruction sets, and a first processor that executes a first instruction set. Execution of the first instruction set causes the first processor to condition one or more captured signals based on one or more signal conditioning instructions, adapt the one or more signals for transmission based on one or more protocols, wherein a message generated comprises one or more discrete signals and one or more signal identifiers.

Execution of the first instruction set also causes the first processor to determine one or more addresses and one or more service ports for one or more application brokers and the one or more equipment logic controllers, the one or more data acquisition systems, or both, and send the first message to the one or more application brokers using the one or more device addresses and the one or more service ports. In some embodiments, the one or more service ports are configured for use as a peer-to-peer connection.

The system also includes a second processor that executes a second instruction set. Execution of the second instruction set causes the second processor to: receive an event notification based on a previous registration process with an event subsystem, process the first message based on the event notification to determine one or more addresses of one or more equipment logic controllers, one or more data acquisition systems, or both based on the signal identifier, generate a structure for communicating one or more discrete signals to the one or more equipment process controllers, the structure comprising interface information used for communicating the structure, and communicate the structure to the one or more equipment process controllers.

In an embodiment, execution of the first instruction set causes the first processor to associate the one or more captured signals with one or more signal identifiers; register an application identifier and the one or more signal identifiers with a reduced instruction set computer architecture based operating system; register the application identifier and the one or more signal identifiers with an operating system of the one or more equipment logic controllers, the one or more data acquisition systems, or both; and persist to storage the one or more signal identifiers.

In another embodiment, first processor comprises one or more registers; and execution of the first instruction set causes the first processor to: create first instantiations of the application specific instructions in the one or more registers; create second instantiations of the one or more program instructions, one or more routines, or both; and perform one or more operations using the registers and the one or more program instructions, one or more routines, or more. In yet another embodiment, each operation is performed in one clock cycle.

In yet another embodiment, execution of the first instruction set causes the processor to determine a process control identifier, a storage identifier, a process control identifier and a storage identifier, or any combination thereof; and send the second message to the one or more application brokers using the one or more device addresses and the one or more service ports.

In still yet another embodiment, the one or more instructions cause the first processor to measure the captured signals, wherein the measure includes determining one or more signal levels, determining one or more signal patterns, determining one or more phases of one or more signals, or both for one or more parameters associated with the one or more sensors.

In yet still another embodiment, the device comprises a power source selector for selecting between multiple power levels; a power over ethernet device; and a PNP-NPN switch coupled to the power source selector and the power over ethernet device, wherein the PNP-NPN converter sources or sinks sensor output in accordance with the power source selector.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired, or wireless. The specification is not intended to limit the scope in this respect.

System

FIG. 1 shows a diagram of system 100 used to manufacture products based on specification and using various manufacturing equipment and control systems, in accordance with one or more aspects of the present disclosure. Corrugated packaging and paper manufacturing are two examples of industries that rely on process control systems to manufacture products according to specifications. Equipment used in these industries can include conveyor rollers and belts, automatic folder gluer machines, drum winding machines, paper machine breast rolls, and roller pressing machines. These machines are designed, engineered, and configured to process raw materials according to operational parameters that must be tightly controlled throughout operations.

System 100 comprises manufacturing plant 102 with equipment 104, 106, 108, and 110 in Plant Area's (PAS) 1A-4A of Location Area (LA) 1. System 100 also comprises, in LA 1, PLC bank 112 of Programmable Logic Controllers (PLC's), sensor groups 114, 116, 118, 120, and devices 122, 124, 126, 128. System 100 further comprises manufacturing plant 140 with equipment 142, 144, 146, 148 in PA's 1B-4B of LA 2. System 100 also comprises embedded system bank 150, PLC bank 152, and sensor groups 154, 156, 158, and 160 in LA 2. System 100 also comprises device 210, control room 1180, and facilities 1140.

In general, equipment 104-110 and 142-148 are designed to process raw materials and assemble the materials into a product, such as paper assembled into corrugated cardboard boxes. Sensor groups 114, 116, 118, and 120 and 154, 156, 158, and 160 are strategically placed at various locations in and around equipment 104-110 and 142-148 and PA's 102 and 140 of LA 1 and LA 2, respectively.

Sensor groups 114-120 and sensor groups 154-160 may include various types of instruments from various manufacturers. The sensors can be used to, e.g., sense (capture) optics, images, sound, pressure, heat, current, voltage, inductance, capacitance, resistance, inertia, magnetism, air quality, atmospheric composition, location, and position. The instruments are configured to output an analog signal, discrete signal, or both in response to a change of a particular variable they are designed to monitor. One or more sensors from sensor groups 114-120 and sensor groups 154-160 may include additional hardware and software used to further process the captured or sensed signals.

One or more sensors from groups 114-120 and groups 154-160 may include sensors with a simple instrument that can, e.g., detect a change in resistance across a circuit. One or more sensors from groups 114-120 and groups 154-160 may be more complex and include an integrated circuit with, e.g., an accelerometer. One or more sensors from groups 114-120 and 154-160 may be even more complicated and include an instrument, e.g., to detect a change in air quality coupled to an embedded system that includes a network interface.

In a manufacturing environment, such as system 100, the number of sensors used to monitor various equipment processes can number in the thousands. Some of the sensors may be older type sensors that do not include any intelligent logic other than to generate a signal in response to a change on its input. Some of the sensors may have limited logic due to the operating environment. Some of the sensors may be MEM type sensors or IIoT sensors with full network capabilities. Sensors that are not designed or configured properly to perform data acquisition at or near the signal source are more likely to influence data accuracy and integrity.

Signals generated by sensor groups 114-120 and 154-160 are conducted and transmitted over conductive mediums 162-1, 162-b, 162-3, and 164, such as copper wires and data cables, to PLC's in banks 112 and 152. Discrete or analog signals are processed and compared to one or more specifications, and control signals are generated in accordance with any deviation from one or more specifications. The control signals are sent back over conductive mediums 162 or 164 where the signal is used to control one or more system processes of equipment 104-110 and 142-148, or devices thereof. Signaling, processing, and control are performed in real-time. Data are communicated to device 210 through gateway device 166 and cloud services 168, either directly or indirectly through PLC banks 112 and 152.

Devices 122, 124, 126, and 128 are embedded systems, System on Chips (SoC), or both that can complement one or more sensors from sensor groups 114-120 and sensor groups 154-160 by conditioning signals and directly interfacing analog and/or discrete signals with device 210. Devices 122, 124, 126, 128, or any combination thereof can also include one or more sensors per device to monitor devices, processes, or both, of equipment 104, 106, 108, and 110.

Devices 122, 124, 126, and 128 can be coupled in proximity to the signal source. Data acquisition and conditioning can occur near the signal source as opposed to an upstream PLC or other upstream device. The number of sensors per PA can number in the 100's and 1000's. The number of sensors that are not considered satisfactory or fail to meet specification requirements can be a significant percentage. The effect of devices 122-128 within the manufacturing ecosystem is a collection of data per operating cycle or period with less data loss and corrupted data.

Each device from devices 122-128 can comprise one or more quick connect terminals 170 for coupling with cable connectors. Terminal(s) 170 can comprise a pin configuration compatible with an M12 connector. Conductive cables or wiring connect one or more sensors from sensor groups 114, 116, 118, and 120 to devices 122-128 through connector 170. In some cases, one or more devices 122-128 may include a sensor packaged with the device. In this case, the terminal configuration will be dependent on the equipment, equipment device, and/or processes thereof the sensor is designed to interface with. Each device from devices 122-128 comprises one or more ethernet ports 172. Ethernet cables connect ethernet ports to PLC bank 112, device 210, or both.

Embedded systems bank 150 can comprise a plurality of quick connect terminals 174 and a plurality of ethernet ports 176. Conductive cables or wiring connect one or more sensors from sensor groups 154, 156, 158, and 160 to terminals 174. Ethernet cables connect ethernet ports 176 to device 210. Embedded systems bank 150 can be positioned as close to the signal source as possible.

Devices 122, 124, 126, and 128 can physically, electrically, and communicably couple with one or more sensors from sensor groups 114, 116, 118, and 120. The sensor may have limited functionality, poor quality, or some other defective that can cause signals generated to consistently be lost or corrupted. Regardless of the type of sensor, or the sensor's manufacture, device 122 can complement any type of sensor from any manufacture. Device 122 can be coupled into an existing conductive medium at or near a sensor, i.e., the signal source.

Device 122 comprises device controller 250 executable and instantiable on device 122. In some cases, device controller 250 can be executable and instantiated on device 122 using a real-time Operating System (OS) and a Reduced Instruction Set Computer (RISC) architecture. Device controller 250 can be coded and configured to operate on a RISC. The device's processor can include a reduced instruction set, and OS 252 includes a kernel and services configured to process application process tasks using the reduced instruction set. Embedded systems bank 150 comprises multiple devices and device controllers like device 122 and device controller 250.

Device controller 250 comprises several application programs and program directives for performing one or more activities in the performance of controlling and managing data generated by a selection of sensors from sensor groups 114, 116, 118, and 120. The programs include an OS and services 252, adapter 254, conditioner 256, storage resource 258, interface 260, interface 262, converter 264, and Power over Ethernet (POE) controller 266.

Device controller 250 also recognizes a set of commands that can be executed by one or more processes of conditioner 254, adapter 256, storage resource 258, signal interface 260, network interface 262, power converter 264, and PoE 266. Commands comprise directives that can add functionality to the installed application programs. These are directives that may not be used that often during production but are needed for development or testing purposes. The directives can either be stored locally or issued by another entity, such as device 210, and stored, temporarily or permanently, after issuance.

Device controller 250 can be configured for execution and instantiation on a multi-core processor. Device controller 250 can be configured for execution and instantiation on a Reduced Instruction Set Computer (RISC) architecture, also referenced herein as RISA. Device controller 250 can be configured to execute an application process task in less than one clock cycle. Device controller 250 can execute threads concurrently.

Device controller 250 performs many operations in the performance of one or more activities involved in the management and control of sensor data. Adapter 254 includes directives that can set the signal to conduct as analog with a range of 0-10 VDC, analog with a range of 4-20 mA, analog with a range of 0-20 mA, or discrete at 24 VDC. This range is dependent on the output of the sensor coupled to device 122 and input at connector 170.

Conditioner 256 can condition signals received over interface 260 in accordance with one or more conditioning directives. A conditioning directive can include filter function for filtering unwanted frequencies. The directive can include a function that amplifies the signal. The frequencies and amplitude can be defined based on the sensor type and other factors to counter conditions that may create interference or dampen the signal.

Converter 264 includes directives to convert signals received through connector 170 and over interface 260 to discrete signals using an NPN (transistor type) switch or a PNP switch. The directives can also set the signal to conduct as analog with a range of 0-10 VDC, analog with a range of 4-20 mA, or analog with a range of 0-20 mA. Converter 264 also includes directives to conduct discrete signals received through connector 170 and over interface 260 using an NPN (transistor type) switch or a PNP switch at the volts of a direct current, e.g., 24 VDC. These ranges and values are dependent on the output of the sensor coupled to device 122 and input at connector 170. The switches respond to changes in their input and have a fast response time that is based on the switches design characteristics. The outputs are discrete signals that are processed by the device's processor.

Adaptor 254 creates a message for transmission that includes one or more discrete signals. Adaptor 254 can also include in the message one or more signal (sensor) identifiers, location area identifiers, plant area identifiers, or any combination thereof. The message can include a packet structure that specifies a source address, one or more destination addresses, transport identifier, and application identifier and/or session identifier. The packet structure can be structured based on the MQTT protocol standard. In some cases, the packet structure can be structured based on the Bluetooth Low Energy (BLE) protocol standard. The transport method used can be UDP/IP, although TCP/IP can also be used. A destination addresses, port numbers, application identifiers and/or session identifiers can be used by OS services 282 to identify one or more brokers 294, and other application processes. In some cases, a peer-to-peer architecture may be used. In which case, devices 122-128 and device 210 are configured to function as both client and server. In this case, designated ports are configured to send and receive communications.

Interface 260 can support serial input, such as RS232, or other similar inputs that can support a series of discrete signals for conditioning and processing. Interface 260 can logically interface data, discrete signals, analog signals, or any combination thereof through a circuit board coupled to connector 170. Connector 170 can include a pair of wires, e.g., single pair ethernet.

Interface 260 can support serial input, such as RS232, or other similar inputs that can support a series of discrete signals for conditioning and processing. Interface 260 can logically interface data, discrete signals, analog signals, or any combination thereof through a circuit board coupled to connector 170. Connector 170 can include a pair of wires, e.g., single pair ethernet.

PoE controller 266 receives power from a POE switch with injector capabilities. Ethernet port 172 comprises a POE switch. When the POE switch is activated, e.g., when an ethernet cable coupling a powered-on device 210 with device 122, power is provided to PoE through one or more electric circuits of device 122. PoE controller 266 manages power provided by providing a select amount of power to the device's processor, and a select amount of power over interface 260 to one or more downstream sensors. Storage resource 258 can include Dynamic Random Access Memory (DRAM) for temporary storage and quick access and Flash memory for persisted storage. Storage resource 258 can store operating system programs, processes, directives, commands, instructions, variables, data structures, signals, signal (sensor) identifiers, location area identifiers, plant area identifiers, sensor group identifiers, sensor identifiers, or any combination thereof either temporarily or permanently.

OS services 252 include various kernel services. Kernel services can include scheduler, threading resources, subsystems, such as power management subsystems and event subsystems, network stack, device drivers, memory management, and network device access and interface services. OS services 252 are operating system services available to conditioner 256, adapter 254, storage resource 258, interface 260, interface 262, converter 264, and PoE controller 266.

Data Acquisition and Master Controller

Data acquisition is the process of collecting data in an organized way so that system can be analyzed to identify system process characteristics, such as failures, inefficiencies, and optimal operation variables. The data can also be used with an analytics engine to predict process characteristics. process failures, determine process improvements. The characteristics themselves can be evaluated to determine the quality or rating of characteristics.

The analysis and evaluation are only as good as the quality and integrity of the data acquired. In) many manufacturing facilities, the data collected through data acquisition system is not entirely complete or is not of the best quality. However, system maintenance during ongoing operations often results in replacement sensors that may be generic or otherwise meet original specification requirements. Due to the operating environment and incompatibility, the replaced sensors can lead to corrupt data, inconsistent data, and lost data. As such, there is a need for a universal adaptor that can work with any type of sensor from any manufacture to ensure the quality and integrity of discrete signals.

Device 210 comprises an acquisition, and master controller ("controller") 280 executable and instantiable on device 210. Controller 280 can execute processes for a master logic controller, a data acquisition system, a data management system, a data analytics system, and a visualization system. Controller 280 can be executable and instantiable on device 210 using one or more real time OS with RISC architecture, one or more OS with a CISC architecture, or both. Controller 280 can be used to supervise system resources and operational processes of equipment 104-110 and 142-148, or devices thereof directly or indirectly through PLC bank 112 and PLC bank 152 based on operational, performance, environmental characteristics, or combinations thereof. Controller 280 can also receive sensor data directly from sensors of sensor groups 114-120 and 154-160 that can communicate over a network interface. Controller 280 can control operations of equipment 104-110 and 142-148, or devices thereof directly and in real-time.

Device 210 can include one or more processing resources that are dedicated to data acquisition, one or more processing resources that are dedicated to process control, and one or more processing resources dedicated to data management. Device 210 can be a computing resource in a distributed computing environment.

Controller 280 comprises one or more Operating Systems with each on a partition or a virtual partition coded and configured to operate on either a Complex Instruction Set Computer (CISC) architecture or RISC architecture. The device's processor can include a complex instruction set or a reduced instruction set, depending on the application. In the case of data acquisition and process control, the device's processor can be a RISC based architecture. In the case of managing bulk data, the device's processor can be a CISC based architecture. The CISC based processor can comprise a complex instruction set, and the RISC based processor can comprise a reduced instruction set. The Operating Systems are compatible with their respective processor architecture type. Each OS comprises a kernel and kernel services.

Controller 280 also comprises applications and tasks for data acquisition 284, (process) logic controller 286, data storage (e.g., Big Data) 288, interface 290, resource ID 292, broker 294, and data management 296. OS services 280 comprises executable instructions for various kernel services, such as for the kernel scheduler, devices, input and output controller, and threads.

Broker 294 comprises an address, e.g., a dedicated address, such as a public or private IP address, port number, transport (data management), and one or more identifiers for each application, application process, process task it is registered with. This can include but not limited to data acquisition 284, process controller 286, data storage 288, interface 290, resource ID 292, 294, data management 296, or any combination thereof. One or more of Broker 294 can be installed on one or more devices of devices 180, 182, 184, 186, 188, 280, or any combination thereof. Broker 294 provides one or more API's for one or more processes 508 of one or more devices of devices 180, 182, 184, 186, 188, 280, or any combination thereof. Broker 294 can be configured to use the Public Key Infrastructure (PKI). Broker 292 may be one of a plurality of brokers managed under a common domain or network. Broker 292 may be node in a plurality of broker nodes in a peer to peer network. Broker 292 may be a node in a distributed computing environment.

Broker 294 includes tasks to receive and manage communications from data acquisition 284, process controller 286, data storage 288, interface 290, resource ID 292, data management 296, PLC bank 112, PLC bank 152, devices 122, 124, 126, 128, embedded systems bank 150, devices 180, 182, 184, 186, monitoring, analytics, visualization application 188, devices 190, 192, or any combination thereof. Communications received can include various commands, configuration settings, software updates, and instructions to issue commands to other devices, applications, application processes, sensors, or any combination thereof.

Commands can include instructions to create or update a file or table to store variables based on one or more identifiers. The identifiers can include, without limitations, sensor identifiers, group identifiers, equipment identifiers, device identifiers, device process identifiers, embedded systems identifiers, SoC identifiers, embedded system package identifiers, operation variables, performance variables, device arrangement variables, and device configuration variables.

The commands can include instructions for conditioning analog sensor signals, discrete signals, or both from device 122, 124, 126, 128, embedded systems bank 150, or any combination thereof. The one or more commands can include instructions for performing analytics on signals received from device 122, 124, 126, 128, embedded systems bank 150, or any combination thereof. The one or more commands can include instructions for testing device 122, 124, 126, 128, embedded systems bank 150, or any combination thereof. The one or more command can include instructions for installing software updates for device 122, 124, 126, 128, embedded systems bank 150, or any combination thereof. The one or more commands can include instructions for configuring the process controller 286 to use MQTT as a network protocol for device 122, 124, 126, 128, embedded systems bank 150, or any combination thereof.

The one or more commands can include directives for configuring data acquisition 284 for streaming sensor data with or without conditioning to monitoring, analytics, visualization application 188 with or without storing data in big data 288. In certain circumstances, this may be advantageous, e.g., when system 100 is under test. The one or more commands can include directives for configuring resource ID 292 with sensor identifiers, updating resource ID 292 with sensor identifier(s), deleting sensor identifiers from resource ID 292.

The one or more commands can include directives for calibrating or tuning one or more sensors from sensor groups 114, 116, 118, 120, one or more devices of device 122, 124, 126, 128, embedded systems bank 150, one or more sensors from sensor groups 154, 156, 158, and 160, or any combination thereof. A calibration command can be used to improve the accuracy of a sensor. A calibration command can include directives for adjusting and aligning a device to ensure that it provides accurate and consistent readings. This process includes comparing readings with a known standard and adjusting to correct for discrepancies. A tuning command can include directives for optimizing performance of a device to achieve a desired output. This process includes adjusting system parameters until a desired performance is achieved.

In some cases, broker 294 may be an application installed on a host system of a $3^{rd}$ party. In which case, broker 294 may authenticate and obtain authorization to access one or more applications, one or more application processes, or both through process controller 286. As an example, process controller 286 can grant access to data acquisition 284 and data management 296 for streaming data directly to monitoring, analytics, visualization application 188 or obtaining datasets from big data 288 for various purposes, such as obtaining signal readings for a select group of devices. In some cases, acquisition, master logic controller 280 may include an analytics algorithmic model for performing real-time analytics. Interface 290 can include control logic for one or more data link layers, network layers, such as MQTT, transport layer, or any combination thereof.

It should be understood to those of skill in the art that acquisition, master logic controller 280 can include multiple brokers with each responsible for managing a unique cluster of devices, with each broker like that of broker 294. Each additional broker may have the same owner or a different owner than broker 294. Each additional broker may have different configuration settings and respond to unique commands. Each additional may have unique network addresses, transport identifiers, application identifiers, authorization privileges, and access control requirements.

Controller 280 can be a Supervisory Control and Data Acquisition (SCADA) system or a Manufacturing Execution System (MES). Controller 280 acts in a supervisory capacity to PLCs in PLC bank 112 and PLCs in PLC bank 152. Controller 280 can also access embedded systems 122-128 and embedded systems bank 150.

Data collected from sensor groups 114-120 and groups 154-160 through PLC bank 112, PLC bank 152, devices 122-128, and embedded systems 150 can be stored in database 288. The data can be structured into distinct datasets and analyzed and evaluated using a simple spreadsheet or a trained algorithmic model to identify system inefficiencies and predict system failures. In some cases, the data may be labeled according to signal characteristics, properties, classification, object types, etc., and used to train and fit the parameter space of an algorithmic model.

Use Case

In control room 1180, Cindy 190, a data analyst, and Paul 192, a systems analyst, need to monitor equipment 104, 106, 108, and 110 and evaluate data associated with certain device processes to determine a total count of product material at various locations in the assembly process of the production areas associated with LA 1. This analysis is used to determine if one or more manufacturing processes are running at the desired speed. The various locations are associated with sensors in sensor groups 114, 116, 118, and 120. However, it has been determined that a sensor in sensor group 114 and a sensor in sensor group 116 that are necessary to perform the needed task are either missing or generating corrupt data due to an improperly tuned sensor.

Based on the circumstances, Process Engineer (PE) A retrieves a simple analog sensor and device 122 from inventory. PE A also retrieves device 124 from inventory. Device 122 can include connector 170, e.g., an M12 connector interface, and ethernet port 172. Device 124 can include one or more sensors. Device 124 can include a terminal or other type of sensor input connector and ethernet port. Devices 122 and 124 can also include an actuator switch that allows PE A to configure converter 264 for 24 VDC discrete input, 0-10 VDC, or 0-20 mA input. PE A installs the simple analog sensor, device 124, and device 124, allowing Cindy and Paul to perform their tests.

Device controller 250 includes a set of commands that were installed when device controller 250 was installed. Devices 124, 126, and 128 also includes similar commands. However, the commands are not active in production. Paul 192 sends an initialization command to devices 122, 124, 126, and 128 to activate the commands. Activating the commands cause one or more processes of OS and services 252, adapter 254, conditioner 256, converter 264, or combinations thereof to keep track of one or more metrics, such as conditioned signals, adapted signals, converted signals, or communicated packets that can be used by Cindy and Paul.

As an example, the one or more processes of each device 122-128 can register a count of rising edges, falling edges, or rising and falling edges for a set period or a selected number of periods. The count or counts recorded are measured against one or more device specifications, process specifications, historical data, or any combination thereof. The results can be used by Cindy 190 and Paul 190 to identify patterns in the count or counts to determine if any anomalies or inefficiencies are interfering with the assembly process.

Device Systems

Devices 122, 124, 126, 128, embedded systems bank 150, and device 210 provide systems and methods that improve the quality and efficiency of manufacturing operations. Devices 122-128 and 150 comprise hardware and systems that improve operations in many product manufacturing settings. Device systems can improve signal quality near the signal source and digitally preserves the signal near its source. These are features that can reduce field maintenance time, maintenance cost, and improve the quality and integrity of data collected for acquisition and analytics purposes.

Figure 2:
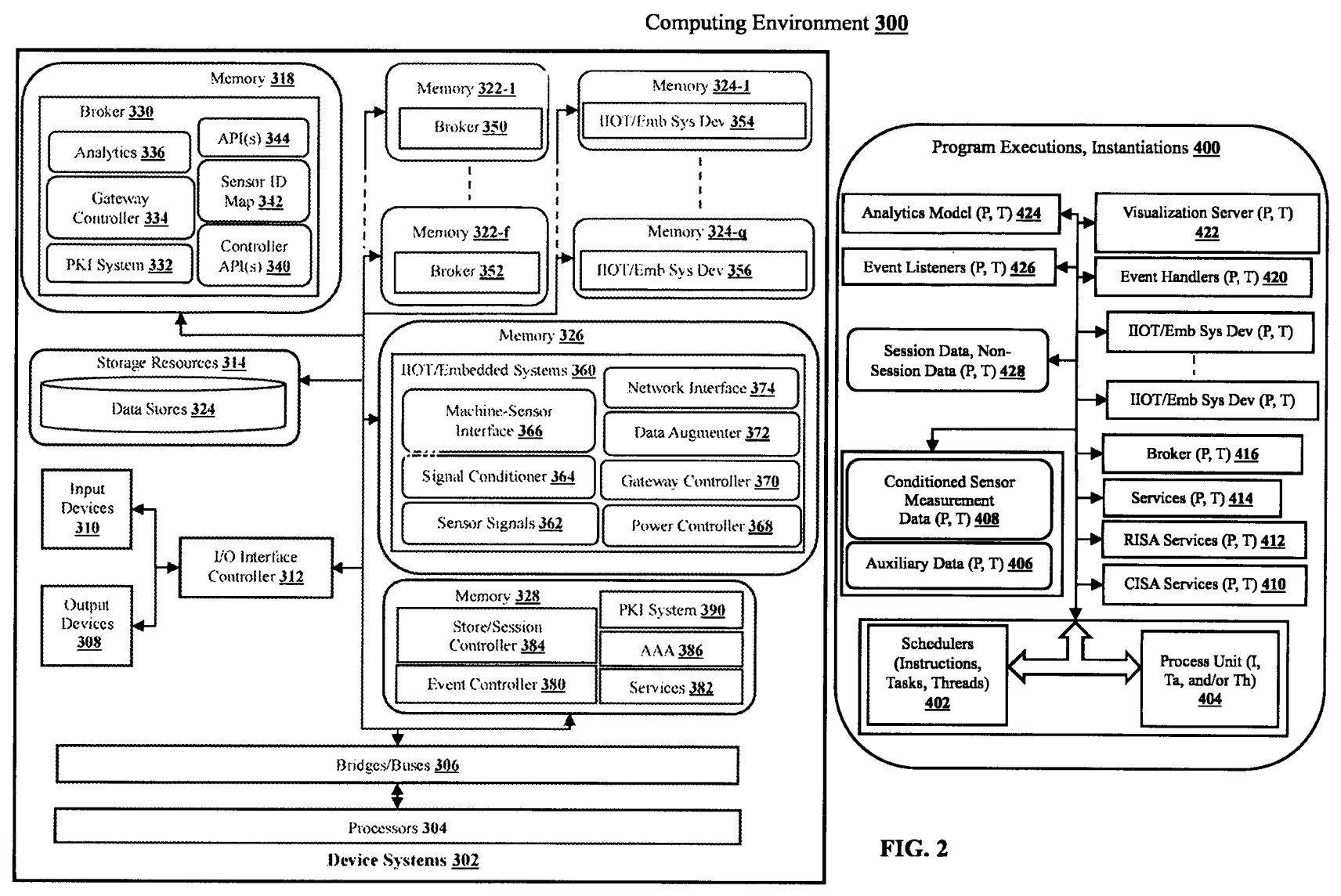

FIG. 2 shows an example of a computing environment 300, in accordance with one or more aspects of the present disclosure. Computing environment 300 comprises device systems upon which applications, application processes, process tasks, process threads, and techniques discussed herein may perform.

Computing environment 300 comprises device systems 302 and device executions and instantiations 400. Device systems 302 comprises instances of software programs configured as application server(s), application client(s), application processes, or any combination thereof. Application programs are executed and instantiated in the hardware of one or more system devices 122, 124, 126, 128, 210, or any combination thereof and processed. Device executions and instantiations 400 comprises processes and tasks of the instantiated application programs. Task instructions are configured to send and receive sensor signals and network data, condition sensor signals, provide power to other one or more processors, one or more sensor, or both, store (persistently or temporarily) sensor signals and data, switch power sources, convert power, adapt analog signals, discrete signals, or both for network communications, and process commands and execute command instructions.

Computing environment 300 comprises processors 304, bridges and/or buses 306, output devices 308, input devices 310, I/O device interface controllers 312, storage resource(s) 314, memory 318, memory 322-1 through memory **322-*f*, memory 324-1 through memory 324-*q*, memory 326, and memory 328**.

Storage resources 314 comprises data stores 324. Memory 318 comprises broker 330. Broker 330 comprises PKI (Public Key Infrastructure) system 332, gateway controller 334, analytics 336, controller API(s) 340, sensor ID map 342, and API(s) 344. Memory 322-1 comprises Broker 350, memory **322-*f* comprises broker 352, memory 324-1 comprises IIoT and/or embedded systems device 354, memory 324-*q* comprises IIoT and/or embedded systems device 356**.

Memory 326 comprises IIoT device and/or embedded system 360. IIoT device and/or embedded system 360 comprises sensor signals, signal conditioner 364, machine-sensor interface 366, input controller 368, gateway controller 370, data augmenter 372, and network interface 374. Memory 328 comprises event controller 380, services 382, store and session controller 384, AAA (Authenticate, Authorize, and Access management and control) 386, and PKI system 390.

PKI system 332 comprises a private key and one or more public keys for one or more of devices of FIG. 1. Gateway controller 334 comprises one or more protocols and logic needed to communicate data from IIoT device and/or embedded systems device 354, 356, 360, or any combination thereof with one or more devices and one or more application processes of FIG. 1. Analytics 336 can include performance characteristics of one or more IIoT/Embedded Systems devices 354, 356, 360, or any combination thereof.

Sensor signals can comprise analog, discrete, or both signals. Signal conditioner 364 comprises one or more techniques to modify the signals to make it suitable for further processing. The signals can be amplified, filtered, isolated, converted, or any combination thereof. Machine-sensor interface 366 comprises connections, protocols, power needed to allow signals to flow from the sensor, power to supply one or more sensors, or any combination thereof. In some cases, machine-sensor interface may include one or more sensors, with each sensor electrically coupled to a device or device process of equipment 104, 106, 108, or 110. to the receiving device or system. Power controller 368 comprises one or more switches configured to provide power to one or more processors of processors 304, machine-sensor interface 366, one or more sensors, or any combination thereof. Gateway controller 370 comprises one or more protocols and logic needed to communicate conditioned signals augmented by data augmenter 372 over 372. Data augmenter comprises one or more parsers, encoders, or both needed to construct communication messages needed for gateway controller 370 to communicate the messages over network interface 374. Network interface 374 comprises the commands needed to address and control a network interface controller for communicating data over an output device.

Processors 304 can include without limitation single microprocessors for one or more devices, a single microprocessor with multiple cores configured as a multi-core processor system for one or more devices, a plurality of microprocessors configured as a multi-processor system for one or more devices, a plurality of microprocessors with one or more microprocessors having multiple cores configured as a multi-processor, multi-core system for one or more devices, or any combination thereof. Processors 304 can include without limitation Central Processing Units (CPU), Graphics Processing Units (GPU), microcontrollers, digital signal processors, application-specific instruction set processors, or any combination thereof.

Memory 318, 322, 324, 326, and 328 can include dynamic memory, static memory, RAM, ROM, FLASH, EEPROM, cache memory, or any combination thereof. Memory 318, 322, 324, 326, and 328 can be addressed and controlled for data processing operations using a bridge, bus 206, or both.

Output devices 308 can include one or more peripheral devices, such as a printer, video display, card reader, network interface card, one or more sensors, etc. Input devices 310 can include one or more sensors, one or more peripheral devices, such as a mouse, keyboard, network interface card, etc. Sensors can include, without limitation, tri-axial accelerometers, temperature, vibration, MEMS, torque, and pressure sensors.

An IIoT device that includes embedded systems can comprise one or more sensors placed on the printed circuit with the embedded systems or otherwise packaged with the IC chip and other components. An IIoT device that includes a SoC can comprise an integrated circuit chip, e.g., one that includes discrete components like microprocessors, memory units, and peripheral interfaces, and one or more sensors coupled to one or more peripheral interfaces.

I/O interface controller 312 can encode and decode data based on various telecommunication standards for connecting, controlling, and communicating with input devices 310 and output devices 308. The standards can include, as an example, serial, parallel, or other wired or wireless protocols used to connect to, communicate with, or control one or more peripheral devices.

Storage resources 314 can be nonvolatile storage devices for storing data and/or software for use by processors 304. Storage resources 314 can be implemented, for example, with magnetic disk drives or optical disk drives. Storage resources 314 can be configured for loading software and data into memory 318, 322, 324, 326, and 328. Storage resources 314 can be configured for storing data, e.g., big and wide data, in relational database tables. Storage resources 314 can comprise data stores 324. Data stores 324 can include relational databases configured to operate in a distributed computing environment.

Storage resources 314, memory 318, 322, 324, 326, and 328 can include a machine-readable medium on which machine code is stored, embodying, or utilized by any one or more features of the applications described herein.

Machine-readable medium can include solid-state memories and optical and magnetic media, and specific examples of commercially available media include non-volatile memory, Electrically Erasable Programmable Read-Only Memory (EEPROM) memory; magnetic disks, Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

Machine readable medium can include a single medium, or multiple media configured to store machine executable code readable by a digital computer. Machine readable medium can include any medium that can store, encode, or carry software code for execution by the machine and that causes the machine to perform any one or more of the techniques of the present disclosure.

The machine executable code comprises compiled software that includes one or more OS's and various applications. The compiled software may reside completely, or at least partially, within stacks, heaps, or both of one or more of storage device 214, memory 318, 322, 324, 326, 328, or any combination thereof before execution. Upon execution, one or more application processes of the compiled software are instantiated and may reside in one or more of memory 318, 322, 324, 326, processors 304, or any combination thereof. One or more process units, i.e., an instruction or a thread, are processed by processors 304 after instantiation of the one or more application processes. In an example, one or any combination of storage device 214, memory 318, 322, 324, 326, 328, or processors 304 may constitute machine readable media.

Program executions and instantiations therefrom 400 can comprise schedulers (Tasks, Threads) 402, process unit (I, Ta, Th) 404, auxiliary data (P, T) 406, conditioned sensor measurement data (P, T) 408, CISA Services (P, T) 410, RISA services (P, T) 412, services (P, T) 414, broker (P, T) 416, IIoT (or embedded system) (P, T) 418a through 418z, event handlers (P, T) 420, visualization server (P, T) 422, analytics model (P, T) 424, event listeners (P, T) 426, session data, and non-session data (P, T) 428. It should be understood by those skilled in the art that the processes (P's) instantiated at a particular state of computing environment 300 may include different programs, a subset of the programs, or programs not listed.

Schedulers (Tasks, Threads) 402 comprises an indexed list of one or more process instructions (I), one or more process tasks (Ta), one or more threads (Th). Unit of process (I, Ta, Th) 404 comprises one or more program counters, stacks, and registers, or any combination thereof used to process the one or more Instructions (I), Tasks (Ta), one or more threads (Th), or any combination thereof.

Instructions may be transmitted or received over a communications network using a bridge and/or bus 306 and one or more output devices 308 and one or more input devices 310, respectively. Computing environment 300 can communicate data between one or more applications, application processes, and application process tasks spread out over many devices, such as that illustrated in FIG. 1, utilizing any one of a number of inter-process communication techniques, communication protocols, or both.

Inter-process communication techniques can include shared memory, distributed shared memory, message passing, synchronization primitives, and remote procedure calls. Communication protocols can include network layer protocols, transfer layer protocols, and application layer protocols. Some protocols can include (e.g., frame relay, internet protocol (IP), transmission control protocol (TCP), user datagram protocol (UDP), hypertext transfer protocol (HTTP), etc. Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others.

Computing environment 300 can operate as a standalone system or can be networked with other machines that include similar processes and methods in an industrial manufacturing setting. In a network of computing environment 300 and one or more other machines, computing environment 300 can operate in the capacity of a server machine, a client machine, or both in server-client network environments. As an example, computing environment 300 can operate as a peer machine in peer-to-peer (P2P) (or other distributed) network environment that includes monitoring, analytics, and visualization application 188.

Manufacturing, Signaling Diagrams, and Use Cases

Different manufacturing operations can implement different manufacturing processes, control techniques, and monitoring techniques based on the type of product manufactured, and the type of analytics or data needed. The different techniques can include High Volume, High Velocity manufacturing, monitoring based on predictive maintenance techniques, remotely monitoring environmental conditions, and asset monitoring, High-Mix, Low-Volume (HMLV) manufacturing, Lean Manufacturing in HMLV Environments, Quality Control, and Inspection Manufacturing.

HMLV manufacturing techniques include manufacturing a variety of products with different shapes, sizes, and sequences of operations. The signals and data generated are not massive in volume or velocity since the batch sizes are smaller. Lean principles can be applied when using lean manufacturing techniques. Since the focus is on waste reduction, process optimization, and efficient resource utilization, manufacturing that involves lean manufacturing techniques generates manageable volumes of signals and data.

Monitoring techniques for assessing product quality in manufacturing operations perform periodic inspections to maintain acceptable levels of product quality. As such, these techniques do not in general produce large volumes of signals and data. Predictive maintenance techniques rely on sensor signals and data to identify potential faults or equipment failure based on patterns or specific anomalies identified in the predictive analysis of sensor data. This technique also doesn't generate high volumes of continuous signals and data. Remote monitoring techniques can be implemented to monitor health and safety of worker health and safety. These monitoring techniques also do not involve high volumes of data. Asset monitoring techniques can be implemented to track parts, count parts, measure efficiency rates, energy usage, equipment performance, or asset health may not generate high-velocity data streams. The focus is on specific metrics and events rather than continuous real-time data.

Devices 122-128 and embedded systems bank 150 comprise controllers and other logic for interfacing with, managing, or both one or more devices, applications, and application processes of other devices within a domain on a local network or private virtual network. Devices interfaced with and/or managed can include a selection of sensor(s) of groups 114-120 and groups 154-160, devices 122-128, embedded systems bank 150, PLC 1 through PLC K 152, devices 180 through 186, monitoring, analytics, visualization application 188, device 190, device 192, device 210, or any combination thereof.

Applications and application processes interfaced with and/or managed directly or indirectly can include OS and services 252, adapter 254, conditioner 256, storage resource 258, interface 260, interface 262, converter 264, OS and services 282, data acquisition 284, process controller 286, resource ID 292, application broker 294, and data management and controller 296.

Figures 3A, 3B:
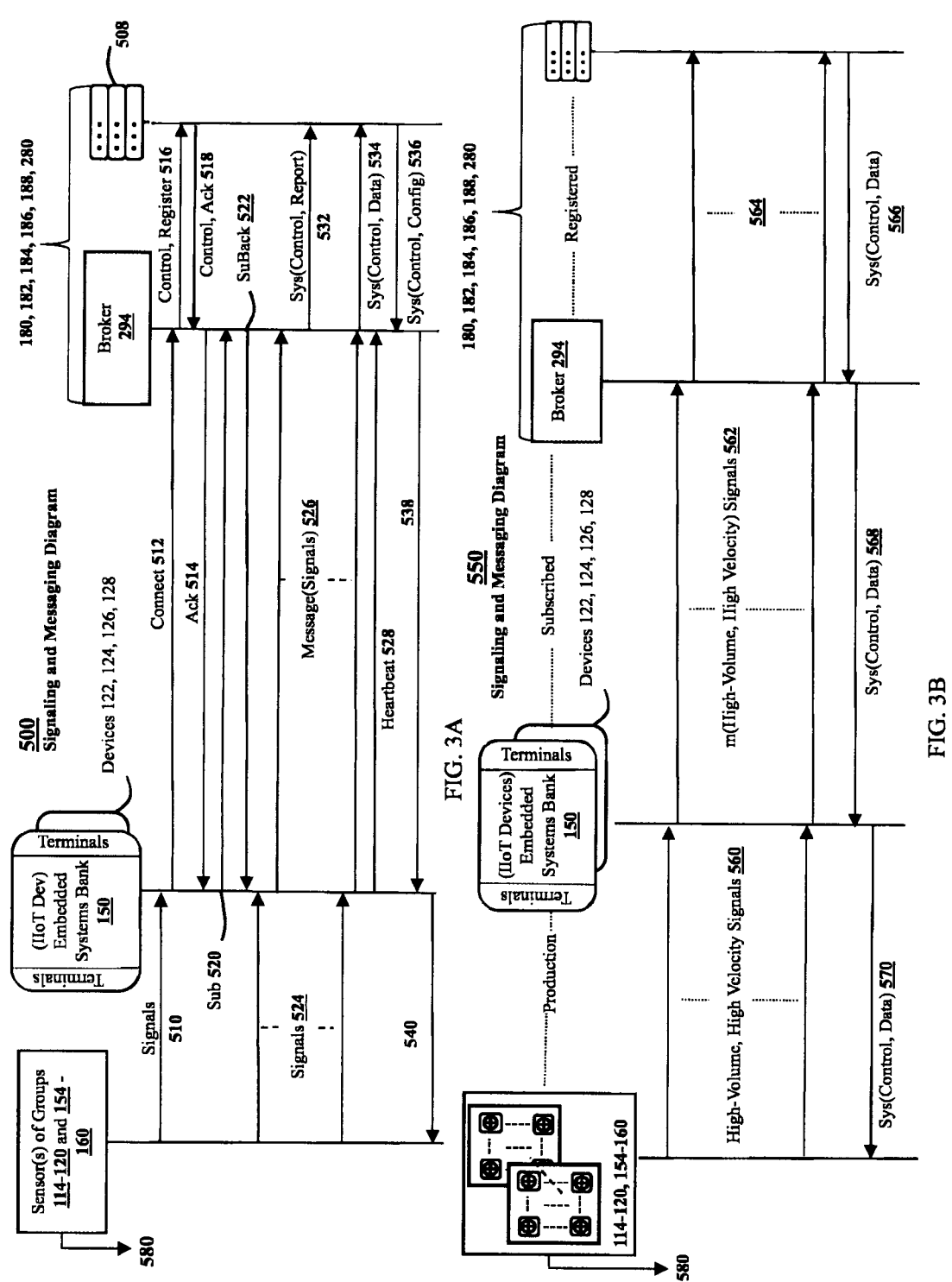
FIG. 3A shows an illustration of a flow diagram that describes a signaling and communication process between system devices for creating processing continuity between system devices so that various operations can be performed, in accordance with one or more aspects of the present disclosure.
FIG. 3B shows an illustration of a signaling diagram for processing, adapting, and communicating sensor signals, and configuring manufacturing equipment, in accordance with one or more aspects of the present disclosure.

FIG. 3A shows an illustration of flow diagram 500 that describes a signaling and messaging process that facilitates equipment and device maintenance operations and improves the quality and integrity of data management and analysis, in accordance with one or more aspect of the present disclosure.

In the previously discussed use case, Cindy 190 and Paul 192 needed to determine a total count of parts at a particular point in the assembly process to determine if a system process was running at specified speeds or at optimal efficiency. In this example use case, one or more processes of each device 122-128 registered a count of rising signal edges, falling signal edges, or rising and falling signal edges for a set period or a selected number of periods. The count or counts recorded were measured against one or more device specifications or process specifications. The results were used by Cindy 190 and Paul 190 to determine if any anomalies or inefficiencies were affecting speed and/or efficiency.

In the current case, a heartbeat protocol and process are used to access system health. Signaling diagram 500 can begin when one or more devices of devices 122, 124, 126, 128, system bank 150, or any combination thereof are coupled into the manufacturing ecosystem, which can trigger each device into performing one or more tasks. Devices 122, 124, 126, 128, system bank 150 may be coupled with a selection of sensors from sensor groups 114, 116, 118, 120, 154, 156, 158, and 160, each for sensing a particular type of process change and generating analog, discrete, or both signals 510 in response to a detected change in a system process.

Connect 512 comprises a communication message comprising network address information, a connection request, a discrete and/or analog signal, and one or more signal identifiers. Ack 514 comprises a communication message comprising network address information, acknowledgement, and a connection handle. Control, register 516 comprises a system process message comprising a control command and registration request. Control, ack 518 comprises a process interface message having a control command and an acknowledgement. Ack 514 comprises a communication message with an acknowledgement and connection identifier.

In some cases, broker 294 may be an application service of one or more of devices 180, 182, 184, 186, 188, 280, or any combination thereof and executed within the same operating system environment. In some other cases, broker 294 may be an independent hardware device and system communicably coupled with one or more of devices 180, 182, 184, 186, 188, 280, or any combination thereof.

Sub 520 is a message, e.g., a MQTT subscribe message, generated, and issued by devices 122, 124, 126, 128, and embedded systems bank 150 in response to being activated. Activation can occur when the device is first powered up or initiated by another agent, such as a user or application broker 294. Sub 520 messages received by application broker 294 are registered with and managed by broker 294.

Broker 294 issues a subscription, SuBack 522, in response to receiving and processing sub 520, the events of which can be logged for administrative and analytics purposes. Sub 520 and SuBack 522 can include, e.g., various identifiers encoded into the header and configuration settings, commands, and software code associated with the body of Sub 520 and SuBack 522. Each device from devices 122, 124, 126, 128, and embedded systems bank 150 receives analog, discrete or both types of signals from a known selection of one or more sensors of sensor groups 114, 116, 118, 120, 154, 156, 158, 160, or any combination thereof and processes the signals in accordance with one or more instructions, as described in reference to FIGS. 1, 2, and 4. Devices 122, 124, 126, 128, and devices from embedded systems bank 150 communicates signal data, message (signals) 526, to broker 294. The devices can stream signals in real-time or aggregate the signals based on a known period or other parameter for communicating message (signals) 526 in bulk.

Broker 294 communicates message (signals) 526 to one or more processes 508 of one or more devices of 180, 182, 184, 186, 188, 280, or any combination thereof. Broker 294 can receive, process, and store message (signals) 526 prior to interfacing message (signals) 526. In some cases, received message (signals) 526 may be conditioned to improve data quality and integrity.

Broker 294 provides one or more API's for one or more processes 508 of one or more devices of devices 180, 182, 184, 186, 188, 280, or any combination thereof. uses, at least in part, a control handle or application handle to interface data 534 to one or more other processes 508. Data can comprise signals, signals and meta data, signals, or signals and a reference to metadata. The metadata can comprise an identifier used by one or more other processes 508 to correlate the signals with one or more groups of signals 580 and store the correlated signals in an appropriate table of a dataset. The metadata can also include one or more tags. Broker 294 can label the signals with a particular tag based on one or more classifications and one or more categorized groups. The classifications and groups can be determined using an algorithm. In some cases, the algorithm can determine a classification, category, or both based on one or more signals, metadata, a trained generative algorithmic model, one or more datasets, or any combination thereof.

In some cases, one or more other processes 508 can issue one or more commands for one of the other processes or devices. As an example, one or more other processes 508 can issue configuration commands, (control, data 534), for one or more sensors by using a control handle that can be used by application broker 294 to determine a device from devices 122, 124, 126, 128, embedded systems bank 150, a sensor group identifier, and a sensor identifier. Data associated with the configuration command can include one or more directives for testing the sensor, tuning the sensor, calibrating the sensor, powering the sensor, or any combination thereof.

Broker 294 can send message(s) 538 to one or more devices of devices 122, 124, 126, 128, embedded systems bank 150, or any combination thereof. The respective devices can send message(s) 540 that comprises the data, including directives.

In some cases, reports can be generated based on periodic heartbeat signals generated by one or more devices of devices 122, 124, 126, 128, embedded system bank 150. In some cases, one or more devices of devices 122, 124, 126, 128, embedded system bank 150 can act as a master to one or more other devices of devices 122, 124, 126, 128, embedded system bank 150. In this case, each slave device sends heartbeat signals to the master device. Heartbeat signals can be used to validate a sensor, device, a collection of sensors, a collection of devices, or combinations thereof.

Heartbeat signals can be used to align system clocks or other time sensitive device operations, system operations, or equipment operations. Heartbeat signals can be used to provide real-time data for performance analytics. Heartbeat signals can be used to notify operations or maintenance when a problem is detected.

FIG. 3B shows an illustration of flow diagram 550 that describes a signaling and communication process for processing and managing sensor signals generated in a manufacturing setting and used for controlling manufacturing processes and process improvement, in accordance with one or more aspects of the present disclosure.

Signals 560, e.g., high-volume, high-velocity signals, generated by a selection of sensors from sensor groups 114, 116, 118, 120, a selection of sensors from sensor groups 154, 156, 158, 160, or any combination thereof are processed by one or more devices of devices 122, 124, 126, 128, one or more devices of embedded systems bank 150, or any combination thereof. Processed signals, messages 562, are communicated to one or more devices 180, 182, 184, 186, 188, 280, or any combination thereof. Messages 562 are processed, processed communications 564, by one or more processes of one or more devices of devices 180, 182, 184, 186, 188, 280, or any combination thereof. Broker 294 generates signal data 564 based on messages 562 and sends signal data 564 to one or more processes of one or more devices of devices 180, 182, 184, 186, 188, 280, or any combination thereof.

One or more devices of devices 122-128, embedded systems bank 150, broker 294, devices 180, 182, 184, 186, 188, 280, or any combination thereof can generate one or more system commands. A system command can comprise a control handle and a report, a control handle and a configuration settings, and a control handle and data. The control handle can comprise a resource identifier that can be used to identify an application process, a sensor group, and one or more sensors. The configuration settings can comprise operation configuration settings for a device, device process, sensor, and sensor process. The configuration settings can comprise commands, programs, one or more identifiers that can be used to identify stored or inactive commands and programs. The data can comprise software for installation, such as software updates and new installs.

In the previous use case, Cindy 190 and Paul 192 used a part count to determine if any anomalies or inefficiencies were affecting speed and/or efficiency of equipment 104, 106, 108, and 110. However, for Cindy's 190 and Paul's 192 analysis to be effective, the signal data captured needs to be tied into other signal data captured in other sensor groups with similar equipment processes to fully understand the original data readings. Lucky for Cindy 190 and Paul 192, devices 122, 124, 126, 128, devices of embedded systems bank 150, broker 294 include logic that labels the signals captured so the captured signals can be correlated with signals 580. In so doing, Cindy 190 and Paul 192 can make more informed decisions about the speed and efficiency of equipment and devices.

System and Device Systems Methods

FIG. 4A shows an illustration of a computer algorithm 600 comprising various instructions for performing one or more of the processes disclosed herein, in accordance with one or more aspects of the present disclosure. Computer algorithm 600 can be embodied in one or more of the devices described in reference to FIGS. 1-3.

Algorithm 600 starts upon execution of a first instruction set that includes the process instructions for logic controller 250. At block 602, one or more signals generated by one or more sensors used to detect deviations from normal operations of manufacturing equipment are electrically coupled through interface 260. The one or more signals are conditioned based on one or more signal conditioning commands. At block 604, the one or more signals are adapted for transmission based on one or more protocols. A message is generated that comprises one or more discrete signals and one or more signal identifiers. At block 606, one or more destination addresses and one or more service ports for one or more application brokers are determined. And one or more destination addresses, one or more service ports, or both for one or more process logic controllers, one or more data acquisition systems, analytics system, or combinations thereof are determined. In some cases, the one or more service ports are configured for use as a peer-to-peer connection. At block 610, the message is sent to the one or more application brokers 294 using the one or more device addresses and the one or more service ports. Upon completion, algorithm 600 returns control to the operating system or ends processing of further instructions.

FIG. 4B shows an illustration of a computer algorithm 700 comprising various instructions for performing one or more of the processes disclosed herein, in accordance with one or more aspects of the present disclosure. Computer algorithm 700 can be embodied in one or more of the devices described in reference to FIGS. 1-3.

Algorithm 700 starts upon the execution of a second set of instructions. At block 702, algorithm 700 receives an event notification based on a previous registration process with an event subsystem. At block 704, algorithm 700 processes the message based on the event notification to determine one or more addresses of one or more equipment logic controllers, one or more data acquisition systems, or both based on the signal identifier. Algorithm 700 continues at block 706 where a structure is generated for communicating the discrete signals to the one or more equipment process controllers, the structure comprising interface information used for communicating the structure. At block 708, algorithm 700 registers an application identifier with the one or more equipment process controllers, data acquisition systems, data management system, or any combination thereof. Upon completion, algorithm 700 returns control to the operating system or ends processing of further instructions.

FIG. 4C shows an illustration of a computer algorithm 800 comprising various instructions for performing one or more tasks of the processes described in algorithm 600, algorithm 800, or both, in accordance with one or more aspects of the present disclosure. Computer algorithm 800 can be embodied in one or more of the devices described in reference to FIGS. 1-3.

Algorithm 800 starts upon execution of one or more commands generated by one or more of the instructions from the processes in algorithm 600 or algorithm 700. The one or more commands identify one or more of the following tasks for execution. At block 802, algorithm 800 associates the one or more signals with one or more signal identifiers. At block 804, algorithm 800 receives a command to register an application identifier and the one or more signal identifiers with a reduced instruction set computer architecture operating system. At block 804, algorithm 800 also persists to storage the one or more signal identifiers. At block 806, algorithm 800 registers the application identifier and the one or more signal identifiers with an operating system of a logic controller, a proxy service, and a process controller. At block 806, algorithm 800 also persists to storage the one or more signal identifiers.

A first instruction set and a second instruction set comprises algorithms 600, 700, and 800. The instruction sets comprise one or more program instructions, one or more routines, or both and application specific instructions derived from a reduced instruction set of a reduced instruction set computer architecture and an instruction set for a complex instruction set computer architecture.

At block 808, algorithm 800 creates first instantiations of the application specific instructions in one or more processor registers, creates second instantiations of the one or more program instructions, one or more routines, or both, performs one or more operations using the registers and the one or more program instructions, one or more routines, or both. In some embodiments, each operation can be performed in one clock cycle.

At block 810, algorithm 800 selects between multiple power levels, draws power from a power over ethernet device based on a selected power level. At block 810, algorithm 800 switches between a PNP interface and a NPN interface based on sensor output and sources or sinks sensor output to a processor in accordance with an interface selected.

At block 812, algorithm 800 conducts analog signals, discrete signals, or both from equipment downstream of the device, and transmits digital communications over a wireless medium, wired medium, or both to one or more logic controllers, one or more data acquisition systems, one or more data management systems, or any combination thereof.

Terms

Operational parameters or system parameters, as used herein, refer to conditions and settings that directly affect the functioning of a system during operation. Operation can include, but not limited to, speed, pressure, temperature, voltage, flow rate, load capacity, timing, and control setpoints. Performance parameters, as used herein, refer to a system's effectiveness, efficiency, and overall capability of a parameter(s) or parameter sets for equipment, machinery, devices, and processes. Performance parameters assess outcomes and ability to deliver specified results.

Environmental parameters, as used herein, refer to external factors and conditions that impact the system but are beyond direct control. Environmental parameters can include, but not limited to, temperature, humidity, pressure, flow rates, velocity, light exposure, vibration and shock, pH (Acidity or Alkalinity), conductivity and resistivity, gas composition, particle size distribution, and viscosity.

Product requirements, as used herein, refer to rules, regulations, restrictions, processes, features, constraints, parameters, or any combination thereof required to satisfy stakeholder interests, industry standards, regulated standards, product specifications, or any combination thereof. System requirements, as used herein, refer to behaviors, functions, capabilities, and constraints of the software tasks and routines used to control equipment, machinery, devices, processes, or any combination thereof.

Computing environment, as used herein, refers to a state of computing machinery where the computing machinery comprises one or more processors, one or more storage resources, one or more memories, one or more software applications, and one or more network resources in the state of processing and communicating electronic information in performance of an application process task.

Application, as used herein, refers to a collection of application programs. An application process, as used herein, refers to an instance of an application program. An application process task, as used herein, refers to one or more instructions that represent a discrete unit of work or operation that a process needs to perform. An application process routine, as used herein, refers to a reuseable block of code that performs a specific task. A process unit or unit of processing, as used herein, refers to a unit of processor utilization and comprises a program counter, stack, and registers used to thread one or more instantiated instructions, one or more tasks, one or more processes, or any combination thereof. A process unit can comprise one or more threads. IIoT device, as used herein, refers to an embedded system, System on a Chip (SoC), or both that include one or more sensors as integral to or a component part of the device or packaged with the device.

A variable, as used herein, refers to a container of data temporarily stored in-memory. Variables can be stored in processor registers, scheduler, stack, and heap depending on its state of processing. A data structure, as used herein, refers to the persistent storage of data database tables and system files. Variables and data structures can comprise a parameter and one or more associated values.

Communication, as used herein, refers to a general use term used to describe digital information configured for use in a computing environment and can include, without limitation, Inter-Process Communications (IPC) and network communications, such as a message and packet structure used for sending information between device processes using a link layer, network layer, or both. Signal, as used herein, refers to an analog or discrete signal that can be conducted over a physical medium between and terminated with terminals of a signal source and a signal sink. Signals do not comprise the overhead of communications.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence or combined into a single step/process. The scope of the claims is intended to broadly cover the disclosed embodiments and any such modification. Further, the following clauses represent additional embodiments of the disclosure and should be considered within the scope of the disclosure.

Clause 1, A device electrically coupled with manufacturing equipment and in digital communications with one or more equipment logic controllers, one or more data acquisition systems, or both, the device comprising: a storage resource that stores multiple instruction sets; a first processor that executes a first instruction set, execution of the first instruction set causes the first processor to: condition one or more captured signals based on one or more signal conditioning commands; adapt the one or more signals for transmission based on one or more protocols, wherein a message generated comprises one or more discrete signals and one or more signal identifiers; determine one or more addresses and one or more service ports for one or more application brokers and the one or more equipment logic controllers, the one or more data acquisition systems, or both; and send the first message to the one or more application brokers using the one or more device addresses and the one or more service ports; wherein the one or more service ports are configured for use as a peer-to-peer connection.

Clause 2, wherein execution of the first instruction set causes the first processor to: associate the one or more captured signals with one or more signal identifiers; register an application identifier and the one or more signal identifiers with a reduced instruction set computer architecture based operating system; register the application identifier and the one or more signal identifiers with an operating system of the one or more equipment logic controllers, the one or more data acquisition systems, or both; and persist to storage the one or more signal identifiers.

Clause 3, the device of any of the preceding clauses, wherein the first instruction set comprises one or more program instructions, one or more routines, or both and application specific instructions derived from a reduced instruction set of a reduced instruction set computer architecture.

Clause 4, the device of any of the preceding clauses, wherein the first processor comprises one or more registers; execution of the first instruction set causes the first processor to: create first instantiations of the application specific instructions in the one or more registers; and create second instantiations of the one or more program instructions, one or more routines, or both; perform one or more operations using the registers and the one or more program instructions, one or more routines, or more; wherein each operation is performed in one clock cycle.

Clause 5, the device of any of the preceding clauses, where execution of the first instruction set causes the processor to: determine a process control identifier, a storage identifier, a process control identifier and a storage identifier, or any combination thereof; send the second message to the one or more application brokers using the one or more device addresses and the one or more service ports.

Clause 6, the device of any of the preceding clauses, wherein the one or more commands cause the first processor to measure the captured signals, wherein the measure includes determining one or more signal levels, determining one or more signal patterns, determining one or more phases of one or more signals, or both for one or more parameters associated with the one or more sensors.

Clause 7, the device of any of the preceding clauses, further comprising one or more electrical terminals coupled with one or more sensors mounted on equipment downstream of the device, wherein the one or more sensors capture analog signals, discrete signals, or both.

Clause 8, the device of any of the preceding clauses, further comprises: a power source selector for selecting between multiple power levels; a power over ethernet device; and a PNP-NPN switch coupled to the power source selector and the power over ethernet device, wherein the PNP-NPN converter sources or sinks sensor output in accordance with the power source selector.

Clause 9, the device of claim 8, further comprising: a sensor connection terminal bank having one or more cable connect terminals for conducting analog signals, discrete signals, or both from equipment downstream of the device; and an ethernet connection frontend having one or more ethernet connect ports for coupling transmitted digital communications over a wireless medium, wired medium, or both to the one or more equipment logic controllers, the one or more data acquisition systems, or both; and wherein the first processor includes one or more terminals coupled to the sensor connection terminal bank, the ethernet connection frontend, the power source selector, the power over ethernet device, and the PNP-NPN switch.

Clause 10, a system electrically coupled with manufacturing equipment and in digital communications with one or more equipment logic controllers, one or more data acquisition systems, or both, the system comprising: a storage resource that stores multiple instruction sets; a first processor that executes a first instruction set, execution of the first instruction set causes the first processor to: condition one or more captured signals based on one or more signal conditioning commands; adapt the one or more signals for transmission based on one or more protocols, wherein a message generated comprises one or more discrete signals and one or more signal identifiers; determine one or more addresses and one or more service ports for one or more application brokers and the one or more equipment logic controllers, the one or more data acquisition systems, or both; and send the first message to the one or more application brokers using the one or more device addresses and the one or more service ports; wherein the one or more service ports are configured for use as a peer-to-peer connection; a second processor that executes a second instruction set, execution of the second instruction set causes the second processor to: receive an event notification based on a previous registration process with an event subsystem; process the first message based on the event notification to determine one or more addresses of one or more equipment logic controllers, one or more data acquisition systems, or both based on the signal identifier; generate a structure for communicating the one or more discrete signals to the one or more equipment process controllers, the structure comprising interface information used for communicating the structure; and communicate the structure to the one or more equipment process controllers.

Clause 11, the system of any of the preceding clauses, wherein execution of the second instruction set causes the second processor to: register an event notification with an event subsystem, wherein the event subsystem comprises information that identifies a transport mechanism, network address, and service port number.

Clause 12, the system of any of the preceding clauses, wherein execution of the second instruction set causes the second processor to: create an interface structure using an application protocol interface of a communications protocol stack, the interface structure comprising protocol type, address information, and port number.

Clause 13, the system of any of the preceding clauses, wherein execution of the second instruction set causes the second processor to condition the first message or one or more parts of the message.

Clause 14, the system of any of the preceding clauses, wherein execution of the second instruction set causes the second processor to: register an application identifier with the one or more one or more equipment process controllers.

Clause 15, a method, comprising: electrically coupling one or more signals generated by one or more sensors used to detect deviations from normal operations of manufacturing equipment; executing a first instruction set for: conditioning the one or more signals based on one or more signal conditioning commands; adapting the one or more signals for transmission based on one or more protocols, wherein a message generated comprises one or more discrete signals and one or more signal identifiers; determining one or more addresses and one or more service ports for one or more application brokers and the one or more equipment logic controllers, the one or more data acquisition systems, or both; sending the first message to the one or more application brokers using the one or more device addresses and the one or more service ports; wherein the one or more service ports are configured for use as a peer-to-peer connection; executing a second instruction set for: receiving an event notification based on a previous registration process with an event subsystem; processing the first message based on the event notification to determine one or more addresses of one or more equipment logic controllers, one or more data acquisition systems, or both based on the signal identifier; and generating a structure for communicating the one or more discrete signals to the one or more equipment process controllers, the structure comprising interface information used for communicating the structure.

Clause 16, the method of any of the preceding clauses, further comprises execution of the first instruction set for: associating the one or more captured signals with one or more signal identifiers; registering an application identifier and the one or more signal identifiers with a reduced instruction set computer architecture operating system; registering the application identifier and the one or more signal identifiers with an operating system of a logic controller, a proxy service, and a process controller; and persisting to storage the one or more signal identifiers.

Clause 17, the method of any of the preceding clauses, wherein the first instruction set comprises one or more program instructions, one or more routines, or both and application specific instructions derived from a reduced instruction set of a reduced instruction set computer architecture.

Clause 18, the method of any of the preceding clauses, further comprising: executing the first instruction set for: creating first instantiations of the application specific instructions in one or more processor registers; and creating second instantiations of the one or more program instructions, one or more routines, or both; and performing one or more operations using the registers and the one or more program instructions, one or more routines, or more; wherein each operation is performed in one clock cycle.

Clause 19, the method of any of the preceding clauses, further comprising: selecting between multiple power levels; drawing power from a power over ethernet device based on a selected power level; switching between a PNP interface and a NPN interface based on sensor output; and sourcing or sinking sensor output to the first processor in accordance with an interface selected.

Clause 20, the method of any of the preceding clauses, further comprising: conducting analog signals, discrete signals, or both from equipment downstream of the device; and transmitting digital communications over a wireless medium, wired medium, or both to the one or more equipment logic controllers, the one or more data acquisition systems, or both; wherein a processor includes one or more terminals coupled to the sensor connection terminal bank, the ethernet connection frontend, the power source selector, the power over ethernet device, and the PNP-NPN switch.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A device electrically coupled with manufacturing equipment and in digital communications with one or more equipment logic controllers, one or more data acquisition systems, or both, the device comprising:
  a storage resource that stores multiple instruction sets;

a processor that executes an instruction set, execution of the instruction set causes the processor to:
  condition one or more captured signals based on one or more signal conditioning commands;
  adapt the one or more signals for transmission based on one or more protocols, wherein a message generated comprises one or more discrete signals and one or more signal identifiers;
  determine one or more addresses and one or more service ports for one or more application brokers and at least one device system comprising the one or more equipment logic controllers and the one or more data acquisition systems; and
  send the message to the one or more application brokers using the one or more addresses and the one or more service ports;
  wherein the one or more service ports are configured for use as a peer-to-peer connection.

2. The device of claim 1, wherein execution of the instruction set causes the processor to:
  associate the one or more captured signals with one or more signal identifiers;
  register an application identifier and the one or more signal identifiers with a reduced instruction set computer architecture based operating system;
  register the application identifier and the one or more signal identifiers with an operating system of the one or more equipment logic controllers, the one or more data acquisition systems, or both; and
  persist to storage the one or more signal identifiers.

3. The device of claim 2, wherein the instruction set comprises one or more program instructions, one or more routines, or both and application specific instructions derived from a reduced instruction set of a reduced instruction set computer architecture.

4. The device of claim 3, wherein the processor comprises one or more registers;
  execution of the instruction set causes the processor to:
  create first instantiations of the application specific instructions in the one or more registers;
  create second instantiations of the one or more program instructions, one or more routines, or both; and
  perform one or more operations using the registers and the one or more program instructions, one or more routines, or more;
  wherein each operation is performed in one clock cycle.

5. The device of claim 1, where execution of the instruction set causes the processor to:
  determine a process control identifier, a storage identifier, or both.

6. The device of claim 1, wherein the one or more signal conditioning commands cause the processor to measure the captured signals, wherein the measure includes at least one of determining one or more signal levels, determining one or more signal patterns, and determining one or more phases of one or more signals for one or more parameters associated with the one or more sensors.

7. The device of claim 1, further comprising one or more electrical terminals coupled with one or more sensors mounted on equipment downstream of the device, wherein the one or more sensors capture analog signals, discrete signals, or both.

8. The device of claim 1, further comprises:
  a power source selector for selecting between multiple power levels;
  a power over ethernet device; and a PNP-NPN switch coupled to the power source selector and the power over ethernet device, wherein the PNP-NPN converter sources or sinks sensor output in accordance with the power source selector.

9. The device of claim 8, further comprising:

a sensor connection terminal bank having one or more cable connect terminals for conducting analog signals, discrete signals, or both from equipment downstream of the device; and an ethernet connection frontend having one or more ethernet connect ports for coupling transmitted digital communications over a wireless medium, wired medium, or both to the one or more equipment logic controllers, the one or more data acquisition systems, or both; and wherein the processor includes one or more terminals coupled to the sensor connection terminal bank, the ethernet connection frontend, the power source selector, the power over ethernet device, and the PNP-NPN switch.

10. A system electrically coupled with manufacturing equipment and in digital communications with one or more equipment logic controllers, one or more data acquisition systems, or both, the system comprising:

a storage resource that stores multiple instruction sets;

a first processor that executes a first instruction set, execution of the first instruction set causes the first processor to:

condition one or more captured signals based on one or more signal conditioning commands;

adapt the one or more signals for transmission based on one or more protocols, wherein a message generated comprises one or more discrete signals and one or more signal identifiers;

determine one or more addresses and one or more service ports for one or more application brokers and at least one device system comprising the one or more equipment logic controllers and the one or more data acquisition systems; and send the first message to the one or more application brokers using the one or more addresses and the one or more service ports;

wherein the one or more service ports are configured for use as a peer-to-peer connection;

a second processor that executes a second instruction set, execution of the second instruction set causes the second processor to:

receive an event notification based on a previous registration process with an event subsystem;

process the first message based on the event notification to determine one or more addresses of one or more equipment logic controllers, one or more data acquisition systems, or both based on the signal identifier;

generate a structure for communicating one or more discrete signals to the one or more equipment process controllers, the structure comprising interface information used for communicating the structure; and communicate the structure to the one or more equipment process controllers.

11. The system of claim 10, wherein execution of the second instruction set causes the second processor to:

register an event notification with an event subsystem, wherein the event subsystem comprises information that identifies a transport mechanism, network address, and service port number.

12. The system of claim 11, wherein execution of the second instruction set causes the second processor to:

create an interface structure using an application protocol interface of a communications protocol stack, the interface structure comprising protocol type, address information, and port number.

13. The system of claim 11, wherein execution of the second instruction set causes the second processor to condition the first message or one or more parts of the message.

14. The system of claim 11, wherein execution of the second instruction set causes the second processor to: register an application identifier with the one or more equipment process controllers.

15. A method, comprising:

electrically coupling one or more signals generated by one or more sensors used to detect deviations from normal operations of manufacturing equipment;

executing a first instruction set for:

conditioning the one or more signals based on one or more signal conditioning commands;

adapting the one or more signals for transmission based on one or more protocols, wherein a message generated comprises one or more discrete signals and one or more signal identifiers;

determining one or more addresses and one or more service ports for one or more application brokers and at least one device system comprising the one or more equipment logic controllers, and the one or more data acquisition systems;

sending the first message to the one or more application brokers using the one or more addresses and the one or more service ports;

wherein the one or more service ports are configured for use as a peer-to-peer connection;

executing a second instruction set for:

receiving an event notification based on a previous registration process with an event subsystem;

processing the first message based on the event notification to determine one or more addresses of one or more equipment logic controllers, one or more data acquisition systems, or both based on the signal identifier; and generating a structure for communicating the one or more discrete signals to the one or more equipment process controllers, the structure comprising interface information used for communicating the structure.

16. The method of claim 15, further comprises execution of the first instruction set for:

associating the one or more captured signals with one or more signal identifiers;

registering an application identifier and the one or more signal identifiers with a reduced instruction set computer architecture operating system-;

registering the application identifier and the one or more signal identifiers with an operating system of a logic controller, a proxy service, and a process controller; and persisting to storage the one or more signal identifiers.

17. The method of claim 16, wherein the first instruction set comprises one or more program instructions, one or more routines, or both and application specific instructions derived from a reduced instruction set of a reduced instruction set computer architecture.

18. The method of claim 17, further comprising:

executing the first instruction set for:

creating first instantiations of the application specific instructions in one or more processor registers; and creating second instantiations of the one or more program instructions, one or more routines, or both; and performing one or more operations using the registers and the one or more program instructions, one or more routines, or more;

wherein each operation is performed in one clock cycle.

19. The method of claim 15, further comprising:

selecting between multiple power levels;

drawing power from a power over ethernet device based on a selected power level;

switching between a PNP interface and a NPN interface based on sensor output; and sourcing or sinking sensor output to the first processor in accordance with an interface selected.

20. The method of claim 15, further comprising:

conducting analog signals, discrete signals, or both from equipment downstream of the device; and transmitting digital communications over a wireless medium, wired medium, or both to the one or more equipment logic controllers, the one or more data acquisition systems, or both;

wherein a processor includes one or more terminals coupled to the sensor connection terminal bank, the ethernet connection frontend, the power source selector, the power over ethernet device, and the PNP-NPN switch.

* * * * *